US009267729B2

(12) United States Patent
Kang

(10) Patent No.: US 9,267,729 B2
(45) Date of Patent: Feb. 23, 2016

(54) HOME APPLIANCE AND METHOD OF CONTROLLING THE SAME

(71) Applicant: SAMSUNG ELECTRONICS CO., LTD., Suwon-si (KR)

(72) Inventor: Hee Jun Kang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 14 days.

(21) Appl. No.: 14/187,953

(22) Filed: Feb. 24, 2014

(65) Prior Publication Data

US 2014/0313047 A1   Oct. 23, 2014

(30) Foreign Application Priority Data

Apr. 19, 2013   (KR) .......................... 10-2013-0043411

(51) Int. Cl.
*F25D 23/12* (2006.01)
*H04L 29/08* (2006.01)

(52) U.S. Cl.
CPC ............... *F25D 23/12* (2013.01); *H04L 67/12* (2013.01); *F25D 2400/361* (2013.01); *G06F 2203/0381* (2013.01)

(58) Field of Classification Search
CPC .................. G06F 2203/0381; H04L 67/12
USPC ................................... 340/692; 715/202, 234
See application file for complete search history.

(56) References Cited

U.S. PATENT DOCUMENTS

| | | | | |
|---|---|---|---|---|
| 7,640,757 | B2 * | 1/2010 | Lee | 62/129 |
| 7,675,504 | B1 * | 3/2010 | Smith et al. | 345/156 |
| 8,156,417 | B2 * | 4/2012 | Sudoh et al. | 715/202 |
| 8,640,025 | B2 * | 1/2014 | Sudoh et al. | 715/234 |
| 2002/0066279 | A1 * | 6/2002 | Kiyomatsu | 62/125 |
| 2005/0109047 | A1 * | 5/2005 | Park et al. | 62/125 |
| 2007/0001058 | A1 * | 1/2007 | Severson | 246/1 R |

\* cited by examiner

*Primary Examiner* — John A Tweel, Jr.
(74) *Attorney, Agent, or Firm* — Staas & Halsey LLP

(57) ABSTRACT

Provided is a home appliance that outputs an operating sound, if a predetermined operating sound output condition is satisfied, the home appliance including: a storage unit that stores at least one sound; a manipulation unit through which a sound to be set as the operating sound is selected from among the at least one sound from a user; a sound output unit that outputs the operating sound; and a controller that controls the sound output unit to output the sound selected by the user to the operating sound, if the operating sound output condition is satisfied. The user directly inputs sounds to the home appliance and selects an operating sound from among the sounds so that the home appliance capable of providing various operating sounds according to a user's taste can be provided.

16 Claims, 17 Drawing Sheets

| SOUND | DO | RE | MI | FA | SOL | RA | SI | DO | RE | MI |
|---|---|---|---|---|---|---|---|---|---|---|
| # | 1 | 2 | 3 | 4 | 5 | 6 | 7 | 8 | 9 | 10 |

(a)

| BEAT | 1/8 | 1/4 | 1/2 | 1 |
|---|---|---|---|---|
| # | 1 | 2 | 3 | 4 |

(b)

PASSING    - MAGIC CASTLE -

(c)

| - | RE | RE | MI | MI | MI | RE | RE | DO | DO |
|---|---|---|---|---|---|---|---|---|---|
| SOUND | 9 | 9 | 10 | 10 | 10 | 9 | 9 | 8 | 8 |
| BEAT | 3 | 2 | 2 | 3 | 3 | 3 | 2 | 2 | 3 |

(d)

HOME APPLIANCE AND METHOD OF CONTROLLING THE SAME

CROSS-REFERENCE TO RELATED APPLICATIONS

This application claims the benefit of Korean Patent Application No. 10-2013-0043411, filed on Apr. 19, 2013 in the Korean Intellectual Property Office, the disclosure of which is incorporated herein by reference.

BACKGROUND

1. Field

Embodiments of the present disclosure relate to a home appliance and a method of controlling the same, and more particularly, to a home appliance that provides a user-customized operating sound and a method of controlling the same.

2. Description of the Related Art

In general, an operating sound refers to a sound that is output to inform a user of an operating state of a home appliance such as when the home appliance is turned on or off, when an operation of the home appliance starts, or when the operation of the home appliance has been completed. The operating sound is also output to warn the user of a malfunction.

Since a user can recognize the operating state of the home appliance and can determine whether the home appliance has malfunctioned through the operating sound, manufacturers of home appliances are manufacturing home appliances such that a variety of operating sounds corresponding to various operating states of the home appliances can be output at the time when the home appliances are manufactured.

However, the variety of operating sounds corresponding to the various operating states of the home appliances are fixed to sounds at the time of manufacture of the home appliances. Thus, a user's desired operating sound cannot be output in response to a user's desired operating state.

SUMMARY

Therefore, it is an aspect of the present disclosure to provide a home appliance that is capable of providing various operating sounds according to a user through a user's direct input of the operating sounds to the home appliance.

Additional aspects of the present disclosure will be set forth in part in the description which follows and, in part, will be obvious from the description, or may be learned by practice of the disclosure.

In accordance with one aspect of the present disclosure, a home appliance that outputs an operating sound, if a predetermined operating sound output condition is satisfied, includes: a storage unit that stores at least one sound; a manipulation unit through which a sound to be set as the operating sound is selected from among the at least one sound from a user; a sound output unit that outputs the operating sound; and a controller that controls the sound output unit to output the sound selected by the user to the operating sound, if the operating sound output condition is satisfied.

The home appliance may further include a display unit that displays an operating sound list corresponding to the operating sound output condition and a sound list corresponding to the at least one sound.

The manipulation unit may allow the sound list and the operating sound list to be mapped to each other so that a sound to be set as the operating sound is able to be selected.

The home appliance may further include a sound input unit through which the sound is input from the user.

The controller may convert the sound input from the sound input unit into sound data and may store the converted sound data in the storage unit.

The home appliance may further include a communication unit that receives sound data of the sound from an external server.

The controller may store the converted sound data in the storage unit.

The operating sound output condition may include at least one selected from the group consisting of turning on the home appliance, turning off the home appliance, starting an operation of the home appliance, completing the operation of the home appliance, changing an operating mode of the home appliance, and changing settings of the home appliance.

In accordance with another aspect of the present disclosure, a method of controlling a home appliance that outputs an operating sound, if a predetermined operating sound output condition is satisfied, includes: receiving at least one sound; selecting an operating sound corresponding to the operating sound output condition from among the at least one sound; and if the operating sound output condition is satisfied, outputting the selected operating sound.

The selecting of the operating sound corresponding to the operating sound output condition may include displaying an operating sound list corresponding to the operating sound output condition and a sound list corresponding to the at least one sound.

The selecting of the operating sound corresponding to the operating sound output condition may include allowing the sound list and the operating sound list to be mapped to each other so that the sound to be set as the operating sound is able to be selected.

The receiving of the at least one sound may include recording sound through a sound input unit.

The receiving of the at least one sound may include receiving the sound from an external server.

In accordance with another aspect of the present disclosure, a graphical user interface to be displayed on a display of a home appliance that outputs an operating sound when a predetermined operating sound output condition is satisfied is described. The graphical user interface includes an operating sound list display region disposed at a first side of the graphical user interface, wherein the operating sound list display region lists a plurality of events of the home appliance in which an operating sound could be output, a sound display region disposed at a second side of the graphical user interface wherein the sound display region displays a plurality of sounds stored in the home appliance, and a selection portion of the graphical user interface to receive a selection of one sound from among the a plurality of sounds displayed in the sound display region and to allow the selected sound to be mapped to the operating sound list displayed in the operating sound list display region, thereby allowing setting of an operating sound.

The operating sound output condition may include at least one selected from the group consisting of turning on the home appliance, turning off the home appliance, starting an operation of the home appliance, completing the operation of the home appliance, changing an operating mode of the home appliance, and changing settings of the home appliance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
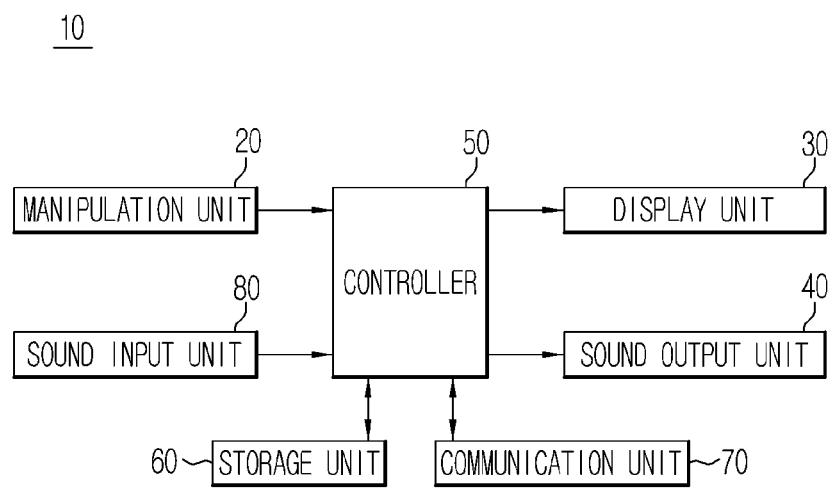
FIG. 1 is a view illustrating a control flow of a sound module according to an embodiment of the present disclosure.

Configurations shown in embodiments enumerated in the present specification and the drawings are just exemplary embodiments of the present disclosure, and it should be understood that there are various modified examples capable of replacing the embodiments of the present specification and the drawings at the time of filing the present application.

Reference will now be made in detail to the embodiments of the present disclosure, examples of which are illustrated in the accompanying drawings, wherein like reference numerals refer to like elements throughout.

FIG. 1 is a view illustrating a control flow of a sound module according to an embodiment of the present disclosure.

Referring to FIG. 1, a sound module 10 according to an embodiment of the present disclosure includes a manipulation unit 20 through which sound information is input from a user, a sound input unit 80 through which a sound is input from the user, a communication unit 70 that downloads sound data from an external server, a storage unit 60 that stores the sound, a display unit 30 that displays operating information of the sound module 10, a sound output unit 40 that outputs the sound, and a controller 50 that controls an operation of the sound module 10.

The manipulation unit 20 may be implemented with a membrane switch, a button type switch, a dial, or a touchpad. The sound information is input to the manipulation unit 20 from the user. That is, the user may input a sound to be input in a particular shape through the manipulation unit 20. For example, when the manipulation unit 20 is implemented with a keypad, the keypad allows musical scales and beats of sounds to correspond to numbers, and the user inputs numbers corresponding to musical scales and beats of desired sounds through the keypad, thereby inputting sound information.

The sound input unit 80 may be implemented with a microphone that converts a sound signal into an electrical signal. The sound input unit 80 receives sound from the user. For example, the sound input unit 80 receives sound signals, such as a user's voice, sounds of nature, and a crying sound of an animal, converts the sound signals into electrical signals and outputs the electrical signals corresponding to the sound signals.

The communication unit 70 may access a local area network (LAN) or a wide area network (WAN), such as the Internet, intranet, or Ethernet, through a near field communication or wired communication, such as wireless fidelity (Wi-Fi), Bluetooth, Zigbee, or near field communication (NFC), and may receive sound data from the external server disposed on the LAN or WAN. The sound data may include sound effects, music in compressed audio format, ring tones, song snippets, or any other type of audio data stored by a user or obtainable from the Internet.

The storage unit 60 stores program or data for controlling the sound module 10. The storage unit 60 may adopt volatile memory, such as dynamic random-access memory (DRAM) or static random-access memory (SRAM), in addition to non-volatile memory, such as a magnetic disc or a solid state disk (SSD). In particular, the storage unit 60 stores the sound data that is input or received through the above-described manipulation unit 20, sound input unit 80, or communication unit 70.

The controller 50 controls the operation of the sound module 10. In detail, the controller 50 may control the operation of the sound module 10 to convert the sound information input through the manipulation unit 20 into sound data and then to store the converted sound data in the storage unit 60 or to convert a sound input through the sound input unit 80 into sound data and then to store the converted sound data in the storage unit 60 or to store the sound data received through the communication unit 70 in the storage unit 60.

Also, if an operating sound output condition is satisfied, the controller 50 controls the sound output unit 40 that will be described below, to output a sound corresponding to the satisfied operating sound output condition. In this way, if the operating sound output condition is satisfied, sound output by the sound module 10 so as to inform the user of an operating situation is referred to as an operating sound, and sound data of the operating sound output to correspond to the occurrence of a particular situation from among a plurality of sound data stored in the storage unit 60 is referred to operating sound data.

Such an operating sound may be selected by the user. That is, the user may select a particular sound from among the plurality of sounds stored in the storage unit 60 and designate the selected sound as an operating sound corresponding to the operating sound output condition. In this case, the controller 50 controls the sound output unit 40 to output the designated sound (operating sound) if the operating sound output condition is satisfied. For example, the user may set a siren sound from among the plurality of sounds stored in the storage unit 60 as an operating sound corresponding to opening a door of a refrigerator and may set a voice of a person "Washing has been completed" as an operating sound corresponding to completing washing of a washing machine. The set voice may be stored as the voice of the user, the user's child, or a favorite celebrity of the user.

The display unit 30 may be implemented with a liquid crystal display (LCD) or light emitting diode (LED) display device. When the user inputs sound information, such as a musical scale and a beat of sound through the manipulation unit 20, the display unit 30 may display the input sound information using musical notes through which the user can check the sound information.

The sound module 10 illustrated in FIG. 1 includes the manipulation unit 20 and the display unit 30 separately. However, aspects of the present disclosure are not limited thereto, and the sound module 10 may include a touch screen panel (TSP) in which the display unit 30 and the manipulation unit 20 are integrally formed.

The sound output unit 40 may be implemented with a speaker that converts an electrical signal (operating sound data) output from the controller 50 that will be described below into a sound signal. The sound output unit 40 outputs the operating sound according to a control signal of the controller 50. In detail, the sound output unit 40 receives the operating sound data corresponding to a user's voice, sounds of nature, sound effects, music, or a crying sound of an animal and outputs the user's voice, the sounds of nature, the sound effects, the music, or the crying sound of an animal corresponding to the received operating sound data.

Hereinafter, examples in which the sound module 10 of FIG. 1 is applied to home appliances will be described.

Figure 2:
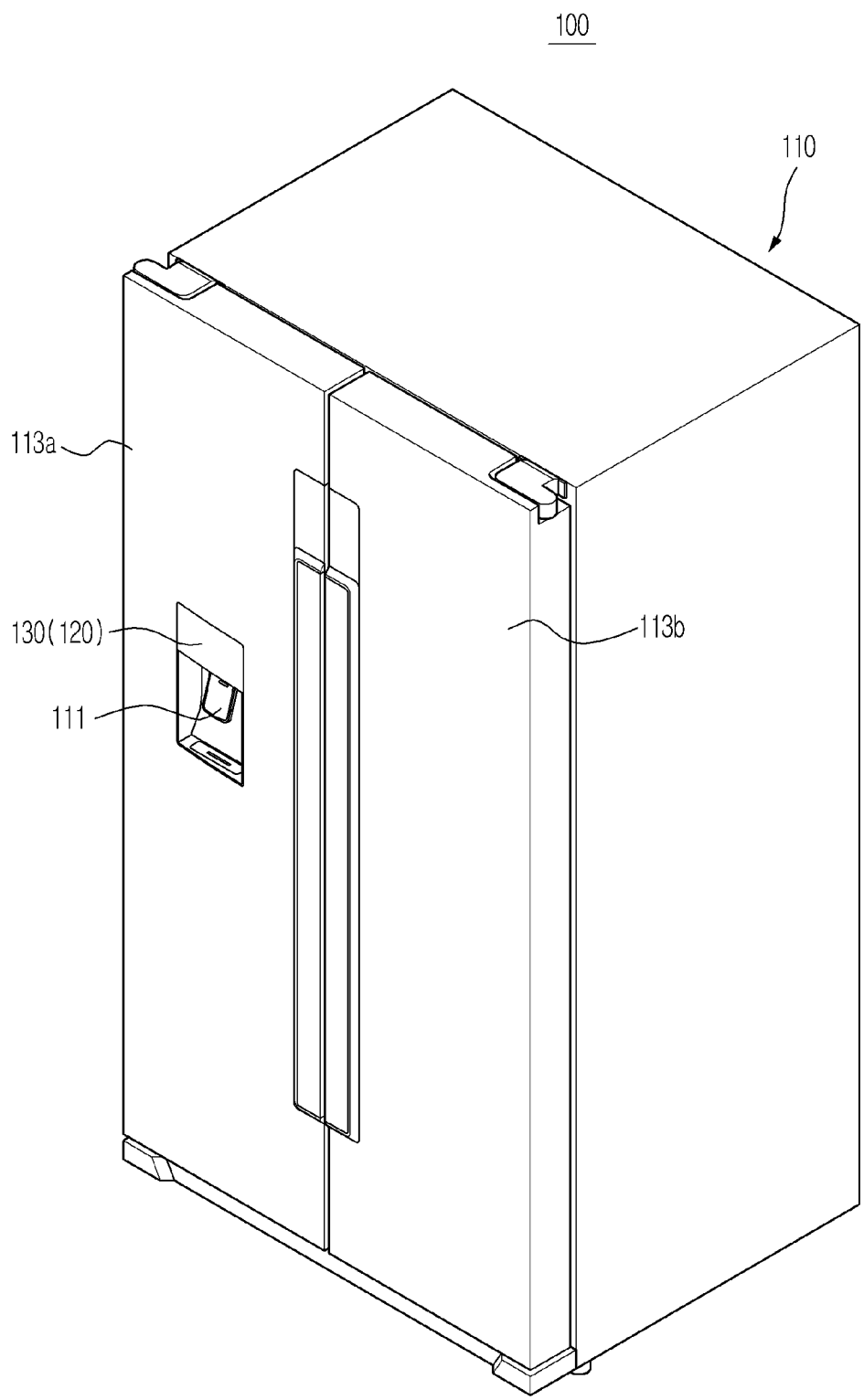
FIG. 2 is a view illustrating the exterior of a refrigerator including the sound module illustrated in FIG. 1.

FIG. 2 is a view illustrating the exterior of a refrigerator including the sound module illustrated in FIG. 1.

Referring to FIG. 2, a refrigerator 100 includes a body 110 that constitutes the exterior of the refrigerator 100, a storage compartment (not shown) that is disposed in the body 110 and stores food, and doors 113a and 113b that cause the storage compartment (not shown) to be shielded from the outside. Although not shown, the refrigerator 100 includes a cooling unit (not shown) that cools the storage compartment (not shown).

The storage compartment (not shown) is partitioned off into a refrigerator compartment (not shown) and a freezer compartment (not shown) by a central partition. The refrigerator compartment (not shown) and the freezer compartment (not shown) are shielded from the outside by a pair of doors 113a and 113b.

A dispenser 111 is disposed in one of the pair of doors 113a and 113b and dispenses filtered water stored in a water tank (not shown) disposed in the refrigerator 100 or ice stored in an ice tray (not shown). Control panels 120 and 130 are disposed on an upper side of the dispenser 111, receive operating instructions from the user, and display operating information of the refrigerator 100. The control panels 120 and 130 will now be described in detail.

The cooling unit (not shown) includes a compressor (not shown) that compresses a refrigerant, a condenser (not shown) that condenses the compressed refrigerant, an expansion valve (not shown) that expands and decompresses the condensed refrigerant, and an evaporator (not shown) that evaporates the decompressed refrigerant. The cooling unit (not shown) cools the storage compartment (not shown) using latent heat absorbed by the refrigerant when the refrigerant is evaporated by the evaporator (not shown).

Figure 3:
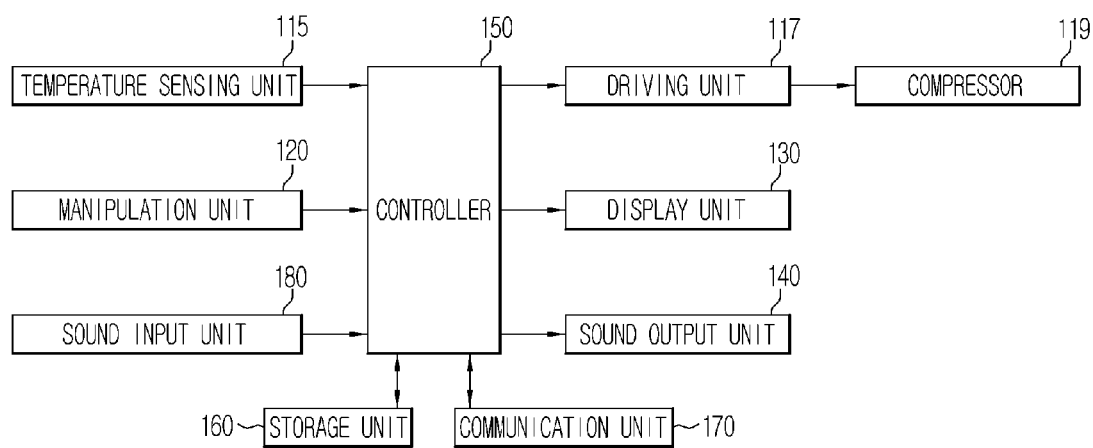
FIG. 3 is a view illustrating a control flow of the refrigerator including the sound module of FIG. 1.

FIG. 3 is a view illustrating a control flow of the refrigerator including the sound module of FIG. 1.

Referring to FIG. 3, the refrigerator 100 includes a temperature sensing unit 115 that detects the temperature of the storage compartment (not shown), a manipulation unit 120 through which operating instructions or sound information are input from the user, a sound input unit 180 through which voice instructions or sounds are input from the user, a driving unit 117 that drives a compressor 119, the compressor 119 that compresses and circulates the refrigerant, as described above, a display unit 130 that displays operating instructions input from the user and operating information of the refrigerator 100 corresponding to the operating instructions, a sound output unit 140 that outputs an operating sound of the refrigerator 100, a communication unit 170 that receives sound data from an external server (not shown), a storage unit 160 that stores a program or data for controlling the refrigerator 100, and a controller 150 that controls the operation of the refrigerator 100.

The manipulation unit 120, the sound input unit 180, the display unit 130, the sound output unit 140, the communication unit 170, and the storage unit 160 are the same as the manipulation unit 20, the sound input unit 80, the display unit 30, the sound output unit 40, the communication unit 70, and the storage unit 60, which have been described with reference to FIG. 1. Thus, detailed descriptions thereof will be omitted.

The temperature sensing unit 115 includes a freezer compartment temperature sensor (not shown) that is disposed in the freezer compartment (not shown) and senses the temperature of the freezer compartment (not shown), and a refrigerator compartment temperature sensor (not shown) that is disposed in the refrigerator compartment (not shown) and senses the temperature of the refrigerator compartment (not shown). The freezer compartment temperature sensor (not shown) and the refrigerator compartment temperature sensor (not shown) each may adopt a thermistor, an electrical resistance value of which varies according to temperature.

Also, the temperature sensing unit 115 provides electrical signals corresponding to temperatures detected by the freezer compartment temperature sensor (not shown) and the refrigerator compartment temperature sensor (not shown) to the controller 150 that will be described below.

The driving unit 117 drives the compressor 119 according to the control signal of the controller 150 that will be described below. In detail, the driving unit 117 generates a driving current for driving the compressor 119 according to the control signal output from the controller 150 and provides the generated driving current to the compressor 119.

The compressor 119 operates by the driving current provided by the driving unit 117, compresses the refrigerant evaporated by the evaporator (not shown), as described above, and forcibly transfers the compressed refrigerant to the condenser (not shown) so that the refrigerant can circulate the cooling unit (not shown).

The controller 150 controls the operation of the refrigerator 100. In detail, the controller 150 compares the temperature of the storage compartment (not shown) sensed by the temperature sensing unit 115 with a setting temperature set by the user, and if the temperature of the storage compartment (not shown) exceeds the setting temperature, the controller 150 controls the driving unit 117 and activates the compressor 119 so as to cool the storage compartment (not shown). That is, the controller 150 causes the temperature of the storage compartment (not shown) to be maintained at the setting temperature set by the user so that food stored in the storage compartment (not shown) does not spoil.

In addition, if an operating sound output condition is satisfied, the controller 150 controls the sound output unit 140 to output an operating sound corresponding to the satisfied condition. For example, if the temperature of the storage compartment (not shown) rises abnormally, the controller 150 controls the sound output unit 140 to output an operating sound corresponding to malfunction of the refrigerator 100. As a second example, if a door of the refrigerator 100 is opened for a long time, the controller 150 controls the sound output unit 140 to output an operating sound corresponding to opening the door. More specifically, if the door is left open for a long time, the controller 150 may control the sound output unit 140 to output a portion of the song "Close the Door" by Teddy Pendergrass, which is stored in storage unit 60. As a third example, if the user changes the setting temperature of the storage compartment (not shown), the controller 150 controls the sound output unit 140 to output an operating sound corresponding to a change in the setting temperature.

In addition, the controller 150 may control the sound output unit 140 to generate an operating sound when a noise occurs in the refrigerator 100, like when the compressor 119 operates or an ice-making device makes ice. That is, when it is expected that a noise generated in the refrigerator 100 may create an unpleasant feeling in the user, the controller 150 may control the sound output unit 140 to generate the operating sound so as to mask the noise thus relieving the unpleasant feeling of the user and informing the user of operating information of the refrigerator 100.

As described above, the configuration of the refrigerator 100 including the sound module 10 illustrated in FIG. 1 has been described. Hereinafter, the case that the refrigerator 100 including the sound module 10 of FIG. 1 receives and stores a sound and sets the stored sound as an operating sound, will be described.

Figure 4A:
FIGS. 4A and 4B are views illustrating the case that sound information is input to the refrigerator including the sound module of FIG. 1 through an input unit.
Figure 4B:
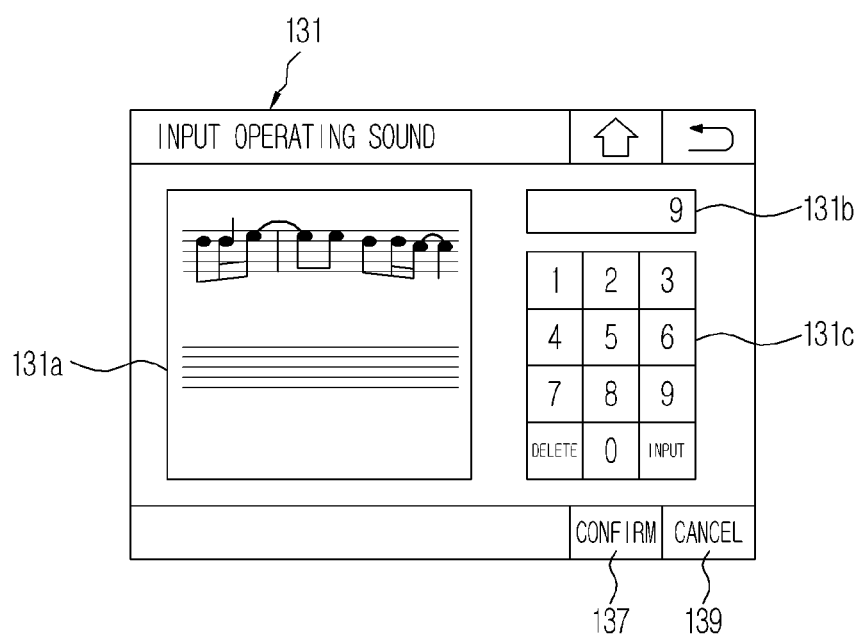

FIGS. 4A and 4B are views illustrating the case that an operating sound is input to the refrigerator 100 including the sound module 10 of FIG. 1 through an input unit.

In order to input a sound through the manipulation unit 120, numbers may be designated as operating sound information corresponding to a musical scale and a beat of the sound.

(a) and (b) of FIG. 4A illustrate a method of designating numbers corresponding to the musical scale and the beat of the operating sound.

As illustrated in (a) of FIG. 4A, number "1" may be designated as a musical scale "do", number "2" may be designated as a musical scale "re", and number "3" may be designated as a musical scale "mi". In this manner, numbers from 1 to 10 may be designated from "do" that is a low musical scale to "mi" that is a relatively high musical scale. Also, as illustrated in (b) of FIG. 4A, number "1" may be designated as a one-eighth beat, number "2" may be designated as a quarter beat, number "3" may be designated as a half beat, and number "4" may be designated as one beat.

Sound illustrated in (c) of FIG. 4A will be displayed as shown in (d) of FIG. 4A, using methods illustrated in (a) and (b) of FIG. 4A.

As illustrated in (c) of FIG. 4A, sound to be input by the user includes high "re" having a half beat, high "re" having a quarter beat, high "mi" having a quarter beat, high "mi" having a half beat, high "mi" having a half beat, high "re" having a half beat, high "re" having a quarter beat, high "do" having a quarter beat, and high "do" having a half beat.

As illustrated in (d) of FIG. 4A, the user may input musical scale information of 9 and beat information of 3 in correspondence to high "re" having a half beat, musical scale information of 9 and beat information of 2 in correspondence to high "re" having a quarter beat, and musical scale information of 10 and beat information of 2 in correspondence to high "mi" having a quarter beat. In this manner, the user may input (9, 3), (9, 2), (10, 2), (10, 3), (10, 3), (9, 3), (9, 2), (8, 2), and (8, 3) through the manipulation unit 120, thereby inputting sound information corresponding to the sound illustrated in (c) of FIG. 4A.

FIG. 4B illustrates the case that sound information is input through a touch screen panel (TSP) of the refrigerator 100 including the sound module 10 of FIG. 1.

As illustrated in FIG. 4B, the manipulation unit 120 and the display unit 130 are integrally formed, thus constituting TSPs 120 and 130. The TSPs 120 and 130 may be implemented by disposing the manipulation unit 120 including a capacitive sensor for sensing touch of a part of the user's body on the display unit 130. Also, the TSPs 120 and 130 may display an icon corresponding to an operating instruction that may be input by the user, using the display unit 130, and if the user touches a portion corresponding to the icon, the capacitive sensor of the manipulation unit 120 detects a position touched by the user and identifies the operating instruction input by the user based on the detected position.

If the user inputs a sound information input instruction through the TSPs 120 and 130, the display unit 130 of the refrigerator 100 displays a sound information input screen 131 illustrated in FIG. 4B. The sound information input screen 131 includes a sound display region 131a in which a sound input by the user is displayed using a manuscript paper and musical notes, a keypad region 131c through which a musical scale and a beat are input from the user, and a sound information display region 131b in which the musical scale and the beat input by the user through the keypad region 131c are displayed.

If a user's touch is sensed by the manipulation unit 120 including the capacitive sensor, the refrigerator 100 calculates a position at which the user's touch is sensed, determines whether the calculated position is within the keypad region 131c of the sound information input screen 131, and if it is determined that the calculated position is within the keypad region 131c, the refrigerator 100 determines which key from among a plurality of keys included in the keypad region 131c. In other words, the user may touch a region corresponding to one from among the plurality of keys displayed in the keypad region 131c, thereby inputting musical scale information and beat information of the operating sound. For example, as illustrated in FIG. 4A, if the user touches regions corresponding to number 9 and number 3 included in the keypad region 131c continuously, the refrigerator 100 displays number 9 and number 3 in the sound information display region 131b of the TSPs 120 and 130 and displays a musical note corresponding to high "re" having a half beat in the sound display region 131a.

In this way, the refrigerator 100 receives sound information from the user using the TSPs 120 and 130 in which the manipulation unit 120 and the display unit 130 are integrally formed and displays a sound corresponding to the input sound information as musical notes. Thus, the user may check sound input by the user oneself.

Figure 5A:
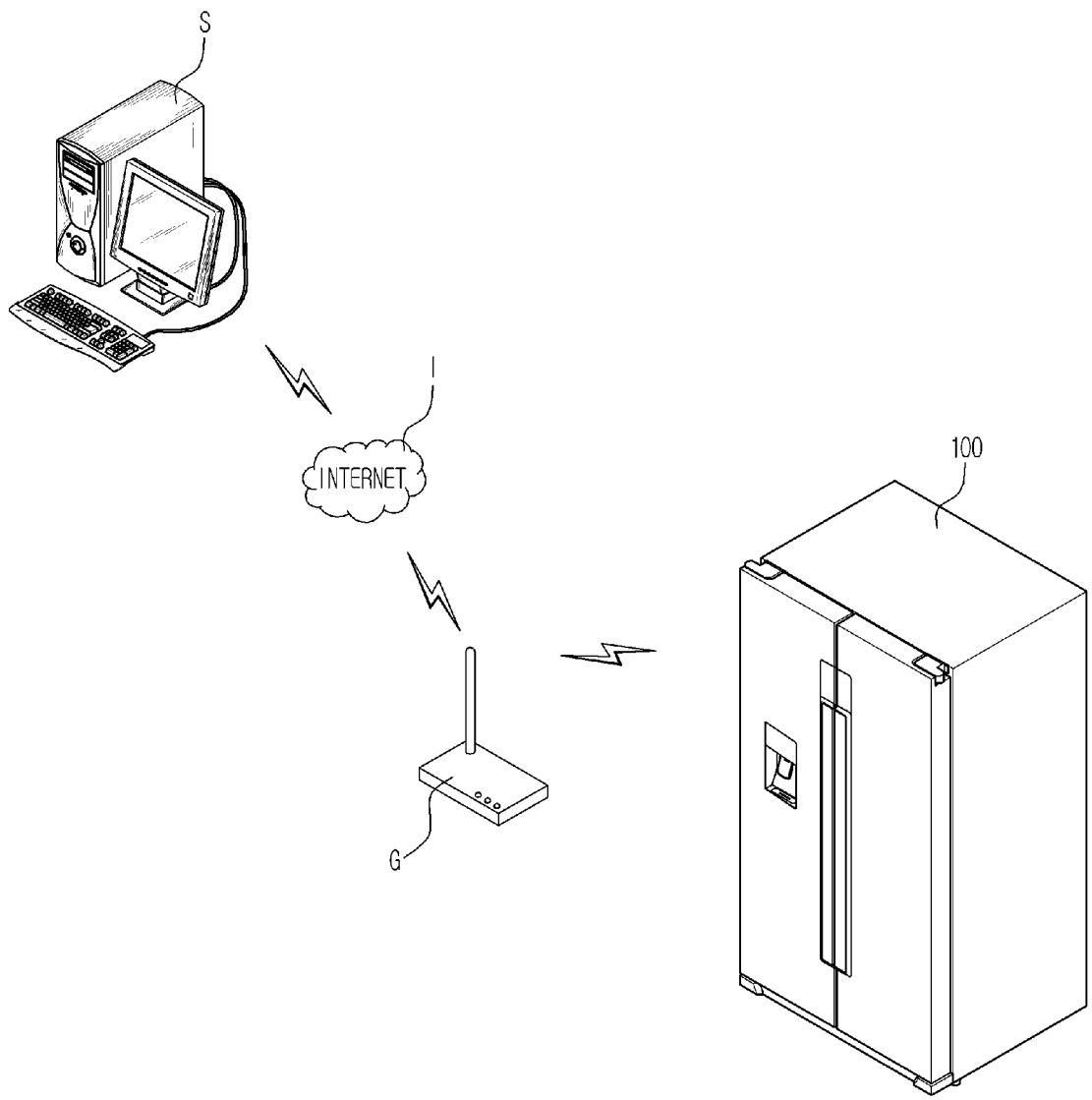
FIGS. 5A and 5B are views illustrating the case that the refrigerator including the sound module of FIG. 1 receives sound data from a communication unit.
Figure 5B:
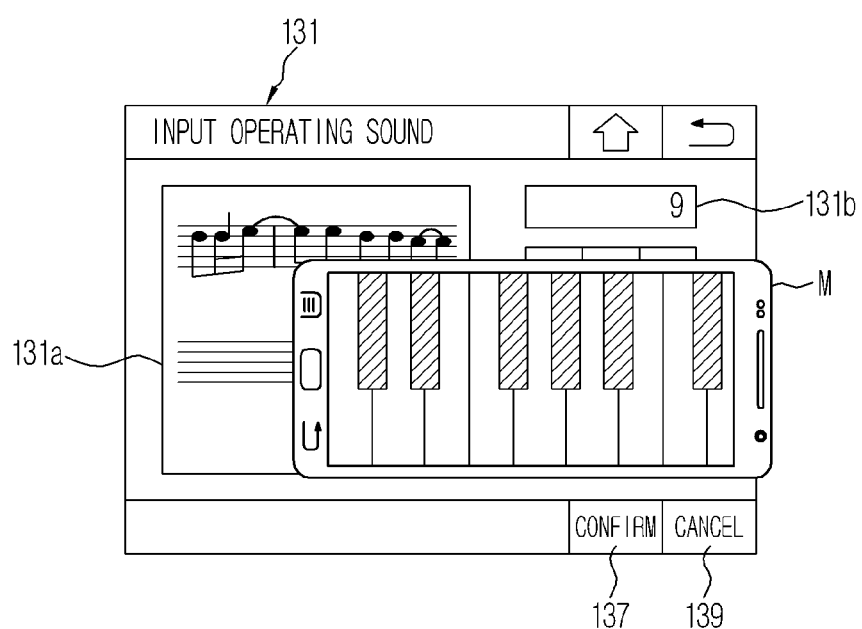

FIGS. 5A and 5B are views illustrating the case that sound data is received through a communication unit of the refrigerator 100 including the sound module 10 of FIG. 1.

Referring to FIG. 5A, which illustrates the case that the sound data is received from an external server S disposed in a WAN, the refrigerator 100 may access a home gateway G through the communication unit 170 and may also access the Internet I through the home gateway G. If the refrigerator 100 accesses the Internet I, the refrigerator 100 may download the sound data stored in the external server S from the external server S on the Internet I. The refrigerator 100 may store the sound data downloaded from the external server S in the storage unit 160. In detail, sound data regarding various sounds, such as sounds of nature, a voice of a person, a crying sound of an animal, and an artificial sound, may be stored in the external server S in various forms, such as a wave file way and a compressed file, for example, mp3. The user may access the external server S through the communication unit 170 of the refrigerator 100 and then may download user's desired sound data and may store the downloaded sound data in the storage unit 160 of the refrigerator 100. In addition, the user may select the user's desired sound data from among sound data stored in the storage unit 160 and may set the selected sound data as an operating sound.

Referring to FIG. 5B, which illustrates the case that a sound is received using a mobile terminal M through which NFC can be performed, the refrigerator 100 may access the mobile terminal M through the communication unit 170. For example, the refrigerator 100 may access the mobile terminal M using an NFC module (not shown) disposed on the communication unit 170. Also, the refrigerator 100 may receive a sound from the user through a user interface disposed on the mobile terminal M. As illustrated in FIG. 5B, a TSP may be disposed on the mobile terminal M, and keys may be displayed on the TSP of the mobile terminal M according to a user's selection.

In this case, if the user touches keys corresponding to user's desired musical scales from among the keys displayed on the TSP of the mobile terminal M, the musical scales are transferred to the refrigerator 100 through NFC between the mobile terminal M and the refrigerator 100. In this manner, the user may input desired sound through the TSP of the mobile terminal M, and the sound is transferred to the refrigerator 100 through NFC.

Figure 6:
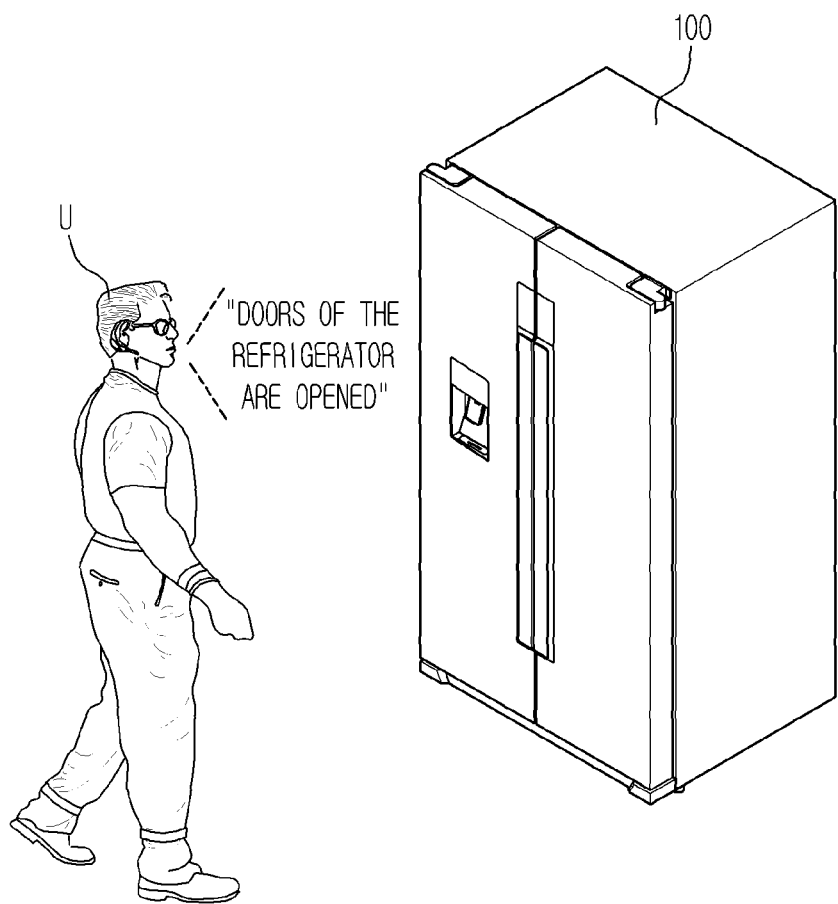
FIG. 6 is a view illustrating the case that sound is input to the refrigerator including the sound module of FIG. 1 through a sound input unit.

FIG. 6 is a view illustrating the case that an operating sound is input to the refrigerator 100 including the sound module 10 of FIG. 1 through a sound input unit.

Referring to FIG. 6, a sound signal may be input to the refrigerator 100 through the sound input unit 180. In detail, if the user inputs a sound recording instruction through the TSPs 120 and 130 of the refrigerator 100, the refrigerator 100 activates the sound input unit 180 and stores the sound signal input through the sound input unit 180 in the storage unit 160. For example, as illustrated in FIG. 6, the user may allow his/her own voice to be stored in the refrigerator 100 and may set his/her own voice as the operating sound. Alternatively, the user may store the voice of the user's child or a favorite celebrity of the user.

The user may designate a particular sound from among a plurality of sounds received through the manipulation unit 120, the communication unit 170, or the sound input unit 180 as the operating sound corresponding to an operating sound output condition. In other words, the user may select one from among the plurality of sounds stored in the storage unit 160 as the operating sound corresponding to a particular condition through the manipulation unit 120. In detail, the refrigerator 100 displays an operating sound setting screen including an operating sound list that indicates an operating sound output condition on which the operating sound may be generated and a sound list that indicates stored sounds on the display unit 130, and the user selects one from among the sounds displayed in the sound list of the operating sound setting screen and allows the selected sound to be mapped to the operating sound list of the operating sound setting screen.

Figure 7A:
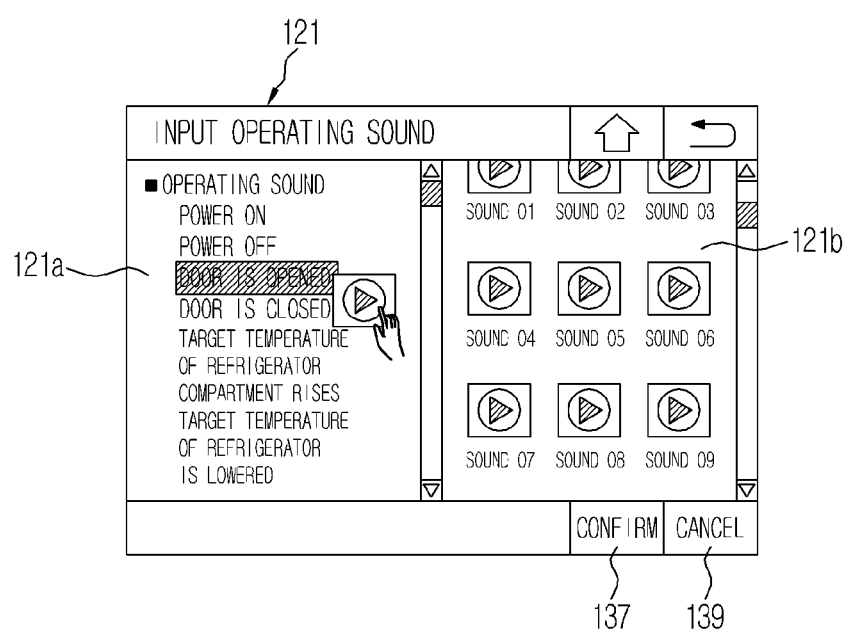
FIGS. 7A and 7B are views illustrating operating sound setting screens of the refrigerator including the sound module of FIG. 1.
Figure 7B:
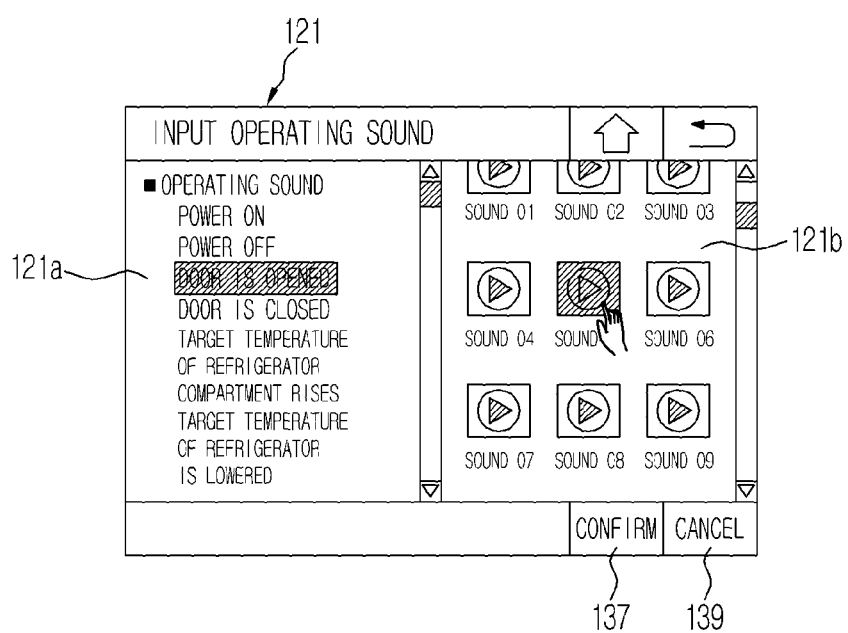

FIGS. 7A and 7B are views illustrating operating sound setting screens of the refrigerator 100 including the sound module 10 of FIG. 1.

If an operating sound setting instruction is input from the user, the TSPs 120 and 130 display an operating sound setting screen 121.

In detail, an operating sound list display region 121a in which the refrigerator 100 displays a time when or an event in which an operating sound is output, may be disposed at the left side of the operating sound setting screen 121. For example, the operating sound list display region 121a displays the case that the user opens or closes a door, the case that the user changes the target temperature of the refrigerator compartment or the freezer compartment, the case that the user takes water from the dispenser disposed in the refrigerator 100, the case that the refrigerator 100 malfunctions, the case that the ice-making device operates, or the case that the compressor 119 operates.

Also, a sound display region 121b is disposed at the right side of the operating sound setting screen 121 and displays sounds stored in the storage unit 160 of the refrigerator 100. That is, the refrigerator 100 displays various sounds that have been input through the TSPs 120 and 130, the communication unit 170, and the sound input unit 180 and stored in the storage unit 160, in the sound display region 121b.

The user may select one from among various sounds displayed in the sound display region 121b and may allow the selected sound to be mapped to the operating sound list displayed in the operating sound list display region 121a, thereby setting an operating sound. For example, in case that doors 113a and 113b of the refrigerator 100 are opened for a long time, the user may select a voice "Doors of the refrigerator are opened" or a song such as "Close the Door" as an operating sound, in case that temperatures of storage compartments 121 and 122 exceed a reference temperature, the user may select a voice "The refrigerator is not operating normally. Please call a near service center." as an operating sound, and in case that the setting temperature of the refrigerator is changed, the user may select a voice "Refrigeration temperature has been changed" as an operating sound.

In detail, as illustrated in FIG. 7A, the user may select one from among a plurality of sounds displayed in the sound display region 121b and may drag and drop the selected sound on one from among operating sound output conditions displayed in the operating sound list display region 121a, thereby setting the operating sound. Alternatively, as illustrated in FIG. 7B, the user may select one from among operating sound lists displayed in the operating sound list display region 121a and may select one from among sound lists displayed in the sound display region 121b, thereby setting the operating sound. Once the setting of the operating sound has been performed, the user may either select the confirm icon 137 or the cancel icon 139 to either confirm or to cancel, respectively, to confirm the setting the operating sound.

If the user allows the operating sound list of the refrigerator 100 to be mapped to the sounds stored in the refrigerator 100 and sets an operating sound of the refrigerator 100, the refrigerator 100 outputs a user's desired operating sound in a user's desired situation. For example, when the user forgets to close the doors 113a and 113b of the refrigerator 100 by his/her own mistake, the refrigerator 100 outputs a voice message "The doors of the refrigerator are opened", instead of outputting a simple sound "beep~~~~" that is an initial value.

Figure 8:
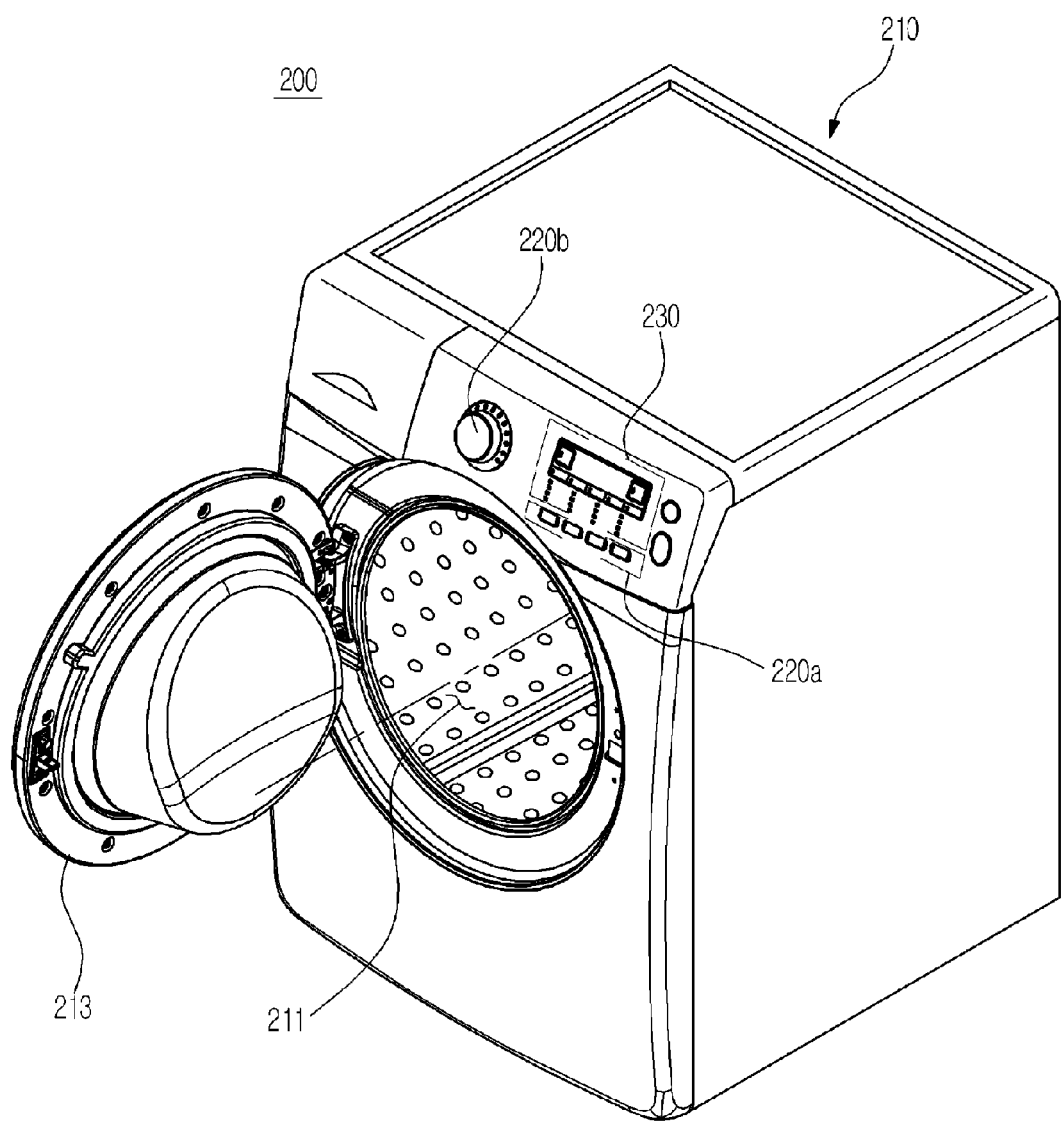
FIG. 8 is a view illustrating the exterior of a washing machine including the sound module of FIG. 1.

FIG. 8 is a view illustrating the exterior of a washing machine including the sound module 10 of FIG. 1.

Referring to FIG. 8, a washing machine 200 includes a body 210 that constitutes the exterior of the washing machine 200, a washing compartment 211 in which an object to be washed is accommodated and washing is performed, a door 213 that shields the washing compartment 211 from the outside, a plurality of buttons 220a and dials 220b through which operating instructions are input from the user, and a display unit 230 that displays operating information of the washing machine 200. Also, although not shown, the washing machine 200 includes a water tank (not shown) in which water used in washing or rinsing is accommodated, a drum (not shown) that is rotatably disposed in the water tank (not shown) and constitutes the washing compartment 211, and a driving motor (not shown) that rotates the drum (not shown).

Figure 9:
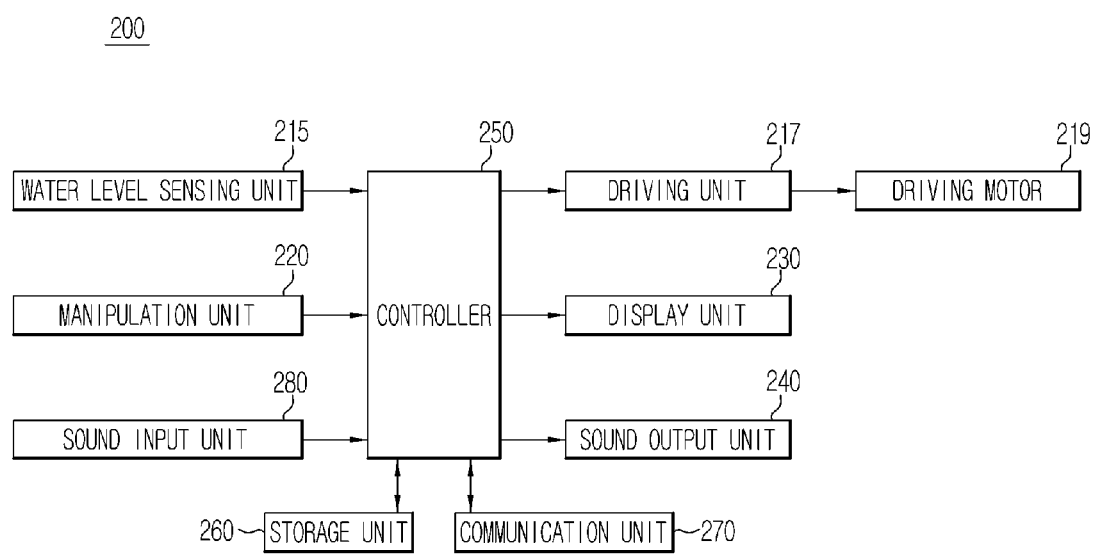
FIG. 9 is a view illustrating a control flow of the washing machine including the sound module of FIG. 1.

FIG. 9 is a view illustrating a control flow of the washing machine 200 including the sound module 10 of FIG. 1.

Referring to FIG. 9, the washing machine 200 includes a water level sensing unit 215 that detects a water level value of water accommodated in the drum (not shown), a manipulation unit 220 through which an operating instruction or sound information is input from the user, a sound input unit 280 through which a voice instruction or sound is input from the user, a driving unit 217 that drives a driving motor 219, the driving motor 219 that rotates the drum (not shown), a display unit 230 that displays the operating instruction input from the user and operating information of the washing machine 200 corresponding to the input operating instruction, a sound output unit 240 that outputs an operating sound of the washing machine 200, a communication unit 270 that receives sound data from an external server (not shown), a storage unit 260 that stores a program or data for controlling the washing machine 200, and a controller 250 that controls an operation of the washing machine 200.

The manipulation unit 220, the sound input unit 280, the display unit 230, the sound output unit 240, the communication unit 270, and the storage unit 260 are the same as the manipulation unit 20, the sound input unit 80, the display unit 30, the sound output unit 40, the communication unit 70, and the storage unit 60, and thus detailed descriptions thereof will be omitted.

The water level sensing unit 215 senses the water level of water supplied to the washing compartment 211 when washing or rinsing is performed and outputs a signal corresponding to the sensed water level.

The driving unit 217 drives the driving motor 219 according to a control signal of the controller 250 that will be described below. In detail, the driving unit 217 generates a driving current for driving the driving motor 219 according to the control signal output from the controller 250 and provides the generated driving current to the driving motor 219.

The driving motor 219 is connected to the drum (not shown), rotates the drum (not shown), and operates by the driving current output from the driving unit 217.

The controller 250 controls the operation of the washing machine 200. In detail, the controller 250 supplies water and detergent to the washing compartment 211 based on a washing course input through the manipulation unit 220 and a detailed setting value of the washing course and controls the driving unit 217 so that the driving motor 219 causes the drum (not shown) to be rotated. That is, the controller 250 washes the object to be washed accommodated in the washing compartment 211 based on the washing course input through the manipulation unit 220 and the detailed setting value of the washing course.

In addition, if an operating sound output condition is satisfied, the controller 250 controls the sound output unit 240 to output an operating sound corresponding to the satisfied condition. For example, if a washing operation of the washing machine 200 has been completed, the controller 250 controls the sound output unit 240 to output an operating sound corresponding to the completing of the washing operation, if a rinsing operation of the washing machine 200 has been completed, the controller 250 controls the sound output unit 240 to output an operating sound corresponding to the completing of the rinsing operation, and if the washing course has been completed, the controller 250 controls the sound output unit 240 to output an operating sound corresponding to the completing of the washing course. Furthermore, based on an output of the water level sensing unit 215, if the water level of the drum (not shown) does not reach a full water level after a predetermined time, the controller 250 may control the sound output unit 240 to output an operating sound corresponding to failure of a water supply device, or if the water level of the drum (not shown) does not reach a minimum water level for a predetermined time, the controller 250 may control the sound output unit 240 to output an operating sound corresponding to failure of a drainage device.

The operating sound of the washing machine 200 may be input by the user as a sound. In detail, sound information, such as a musical scale or a beat of the sound, may be input to the washing machine 200 by the user through the manipulation unit 220, and the washing machine 200 may download sound data from a server on an external communication network through the communication unit 270 according to a user's instruction. Also, sound, such as the user's voice, may be directly input to the washing machine 200 through the sound input unit 280. Subsequently, the washing machine 200 converts the sound input through the manipulation unit 220, the communication unit 270, or the sound input unit 280 into sound data in an appropriate form and stores the sound data in the storage unit 260.

Also, the user may select an operating sound from among input sounds. In detail, the user may select a part from among sounds stored in the storage unit 260 and may set the selected sound as an operating sound of the washing machine 200. For example, the user may select a voice of a person "Washing has been completed" as an operating sound in case of washing completion, and the user may select a voice of a person "Washing water has not been supplied" and "Washing water has not been discharged" as an operating sound in case of poor water supply and poor drainage.

If the user selects the operating sound from among the sounds stored in the washing machine 200, the washing machine 200 outputs a user's desired operating sound in a user's desired situation. For example, when washing is completed, the washing machine 200 may output a voice message "Washing has been completed", instead of outputting a simple sound "beep~~~~" that is an initial value.

Figure 10:
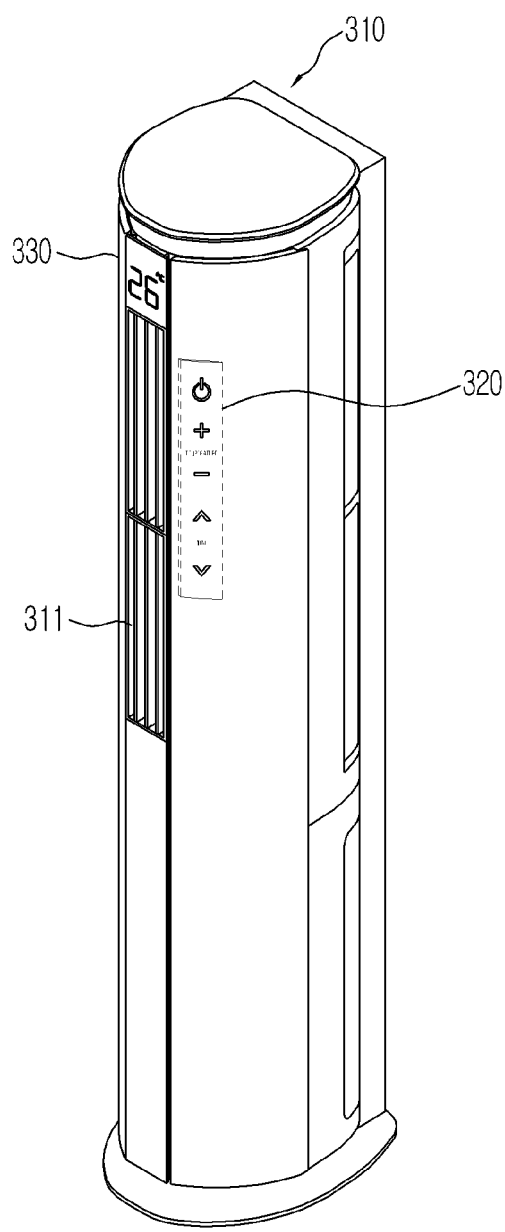
FIG. 10 is a view illustrating the exterior of an air conditioner including the sound module of FIG. 1.

FIG. 10 is a view illustrating the exterior of an air conditioner including the sound module 10 of FIG. 1.

Referring to FIG. 10, an air conditioner 300 includes an indoor unit body 310 disposed in an air conditioning space, an ejection port 311 that is disposed at the front of the indoor unit body 310 and ejects cooled or heated air, a manipulation unit 320 through which an operating instruction is input from the user, and a display unit 330 that displays operating information of the air conditioner 300. Although not shown, the air conditioner 300 includes an outdoor unit (not shown) disposed outside the air conditioning space and a heat exchanging device (not shown) that cools or heats the air conditioning space.

The heat exchanging device (not shown) includes a compressor (not shown) that compresses a refrigerant, an outdoor heat exchanger (not shown) that is disposed in an outdoor unit (not shown) and performs heat exchange between air outside the heat exchanging device (not shown) and the refrigerant, an expansion valve (not shown) that decompresses the heat-exchanged refrigerant, and an indoor heat exchanger (not shown) that is disposed in the indoor unit body 310 and performs heat exchange between air in the air conditioning space and the refrigerant.

In terms of circulation of the refrigerant in case that the air conditioning space is cooled, first, the refrigerant is compressed by the compressor (not shown) and is forcibly transferred to the outdoor heat exchanger (not shown). The compressed refrigerant is condensed by the outdoor heat exchanger (not shown), dissipates heat to the outside, and is decompressed by the expansion valve (not shown). The decompressed refrigerant is evaporated by the indoor heat exchanger (not shown) and absorbs heat from the air conditioning space. In this way, the refrigerant absorbs heat from the air conditioning space at the indoor heat exchanger (not shown) so that the air conditioning space can be cooled.

Figure 11:
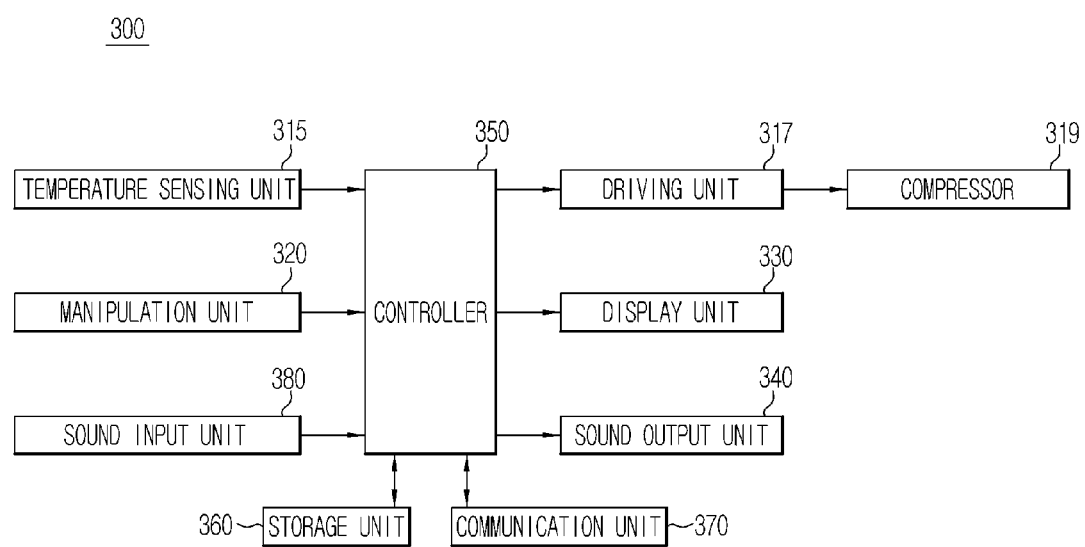
FIG. 11 is a view illustrating a control flow of the air conditioner including the sound module of FIG. 1.

FIG. 11 is a view illustrating a control flow of the air conditioner 300 including the sound module 10 of FIG. 1.

Referring to FIG. 11, the air conditioner 300 includes a temperature sensing unit 315 that detects the temperature of the air conditioning space, a manipulation unit 320 through which operating instructions or sound information are input from the user, a sound input unit 380 through which voice instructions or sounds are input from the user, a driving unit 317 that drives a compressor 319, the compressor 319 that compresses and circulates the refrigerant, as described above, a display unit 330 that displays operating instructions input from the user and operating information of the air conditioner 300 corresponding to the operating instructions, a sound output unit 340 that outputs an operating sound of the air conditioner 300, a communication unit 370 that receives sound data from an external server (not shown), a storage unit 360 that stores a program or data for controlling the air conditioner 300, and a controller 350 that controls the operation of the air conditioner 300.

The manipulation unit 320, the sound input unit 380, the display unit 330, the sound output unit 340, the communication unit 370, and the storage unit 360 are the same as the manipulation unit 20, the sound input unit 80, the display unit 30, the sound output unit 40, the communication unit 70, and the storage unit 60, which have been described with reference to FIG. 1. Thus, detailed descriptions thereof will be omitted.

The temperature sensing unit 315 includes a temperature sensor (not shown) that is disposed in the air conditioning space and senses the temperature of the air conditioning space. The temperature sensor (not shown) may adopt a thermistor, an electrical resistance value of which varies according to temperature. Also, the temperature sensing unit 315 outputs a signal corresponding to the temperature of the air conditioning space.

The driving unit 317 drives the compressor 319 according to the control signal of the controller 350. That is, the driving unit 317 generates a driving current according to the control signal of the controller 350 and provides the generated driving current to the compressor 319.

The controller 350 controls the operation of the air conditioner 300. In detail, the controller 350 compares the temperature of the air conditioning space sensed by the temperature sensing unit 315 with a setting temperature set by the user and controls the compressor 319 according to an operating mode of the air conditioner 300. That is, if the operating mode of the air conditioner 300 is a cooling operating mode and the temperature of the air conditioning space is higher than the setting temperature, or if the operating mode of the air conditioner 300 is a heating operating mode and the temperature of the air conditioning space is lower than the setting mode, the controller 350 controls the driving unit 317 to activate the compressor 319.

Also, if an operating sound output condition is satisfied, the controller 350 controls the sound output unit 340 to output an operating sound corresponding to the operating sound output condition. For example, if power of the air conditioner 300 is turned on or off, the controller 350 controls the sound output unit 340 to output an operating sound corresponding to power turn on/turn off, and if the operating mode of the air conditioner 300 is changed, the controller 350 controls the sound output unit 340 to output an operating sound corresponding to the changed operating mode.

The above-described operating sound of the air conditioner 300 may be selected by the user from among various sounds. In detail, the user may input a musical scale and a beat of the sound through the manipulation unit 320, may download sound data through the communication unit 370, or may input sound through the sound input unit 380, thereby inputting the sound to the air conditioner 300.

In addition, the user may set a part from among the input sounds as an operating sound. For example, when the air conditioner 300 is turned on, the user may select a voice "The air conditioner starts operating" as an operating sound, and when the operating mode of the air conditioner 300 is changed into a pleasant cooling mode, the user may select a voice "The air conditioner blows out pleasant wind" as an operating sound.

After the user sets the operating sound, the air conditioner 300 outputs the operating sound selected by the user.

Figure 12:
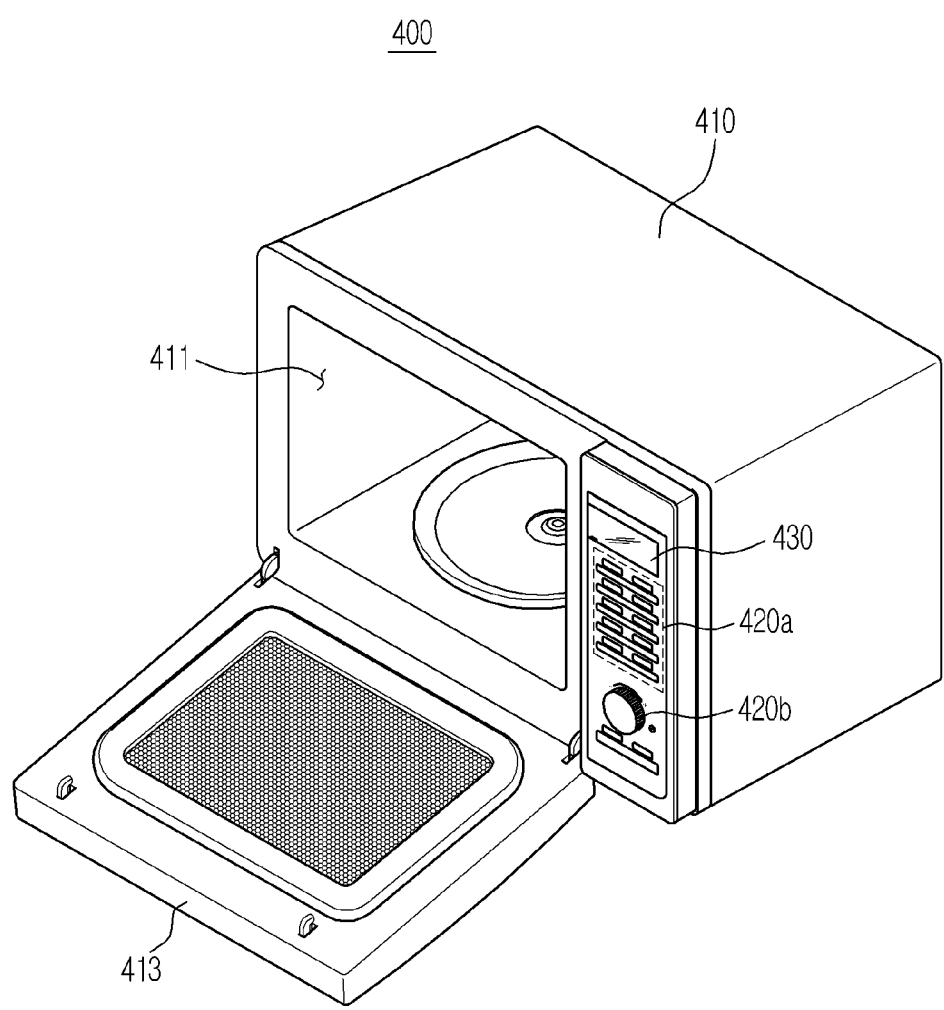
FIG. 12 is a view illustrating the exterior of a cooking apparatus including the sound module of FIG. 1.

FIG. 12 is a view illustrating the exterior of a cooking apparatus including the sound module of FIG. 1.

Referring to FIG. 12, a cooking apparatus 400 includes a body 410 that constitutes the exterior of the cooking apparatus 400, a cooking compartment 411 in which an object to be cooked is accommodated, a door 413 that shields the cooking compartment 411 from the outside, a plurality of buttons 420a and dials 420b through which operating instructions are input from the user, and a display unit 430 that displays operating information of the cooking apparatus 400. Also, although not shown, the cooking apparatus 400 includes a radio-frequency unit (not shown) that radiates a radio frequency into the cooking compartment 411, a convection unit (not shown) that supplies hot wind to the cooking compartment 411, and a grilling unit (not shown) that radiates radiant heat into the cooking compartment 411.

Figure 13:
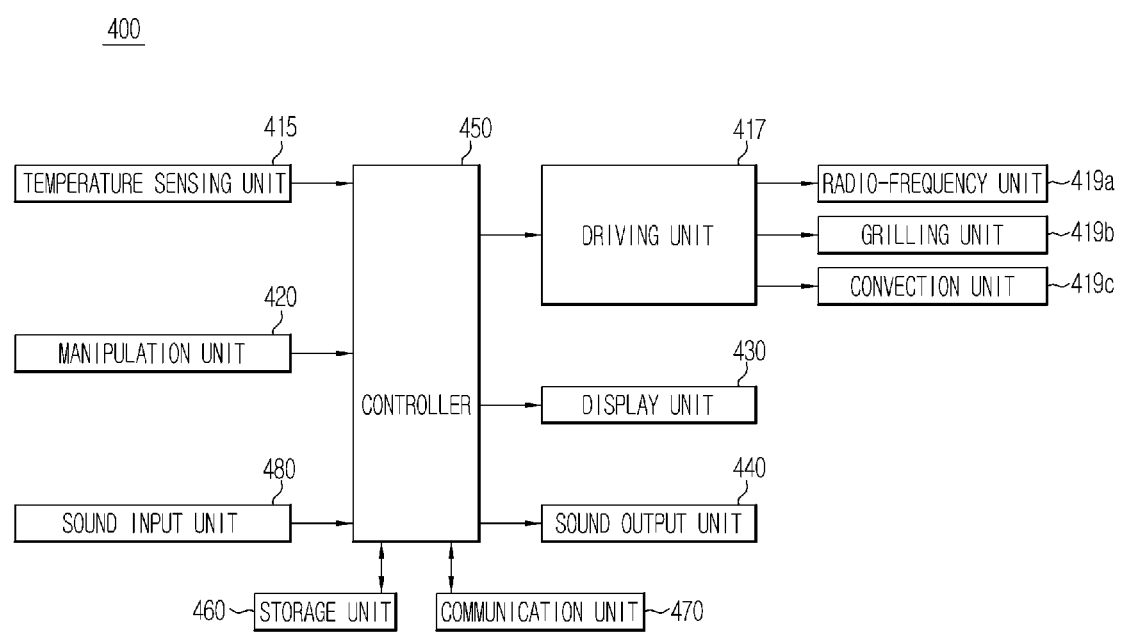
FIG. 13 is a view illustrating a control flow of the cooking apparatus including the sound module of FIG. 1.

FIG. 13 is a view illustrating a control flow of the cooking apparatus 400 including the sound module 10 of FIG. 1.

Referring to FIG. 13, the cooking apparatus 400 includes a temperature sensing unit 415 that detects the temperature of the cooking compartment 411 so as to heat the object to be cooked, a manipulation unit 420 through which operating instructions or sound information are input from the user, a sound input unit 480 through which voice instructions or sounds are input from the user, a driving unit 417 that drives a radio-frequency unit 419a, a grilling unit 419b, and a convection unit 419c, the radio-frequency unit 419a that radiates a radio frequency, the grilling unit 419b that radiates a radiant heat, the convection unit 419c that supplies hot wind, a display unit 430 that displays operating instructions input from the user and operating information of the cooking apparatus 400 corresponding to the operating instructions, a sound output unit 440 that outputs an operating sound of the cooking apparatus 400, a communication unit 470 that receives sound data from an external server (not shown), a storage unit 460 that stores a program or data for controlling the cooking apparatus 400, and a controller 450 that controls the operation of the cooking apparatus 400.

The manipulation unit 420, the sound input unit 480, the display unit 430, the sound output unit 440, the communication unit 470, and the storage unit 460 are the same as the manipulation unit 20, the sound input unit 80, the display unit 30, the sound output unit 40, the communication unit 70, and the storage unit 60, which have been described with reference to FIG. 1. Thus, detailed descriptions thereof will be omitted.

The temperature sensing unit 415 includes a temperature sensor (not shown) that is disposed in the cooking compartment 411 and senses the temperature of the cooking compartment 411. The temperature sensor (not shown) may adopt a thermistor, an electrical resistance value of which varies according to temperature.

The driving unit 417 drives the radio-frequency unit 419a, the grilling unit 419b, and the convection unit 419c according to the control signal of the controller 450.

The radio-frequency unit 419a includes a magnetron (not shown) that generates a radio frequency and a high voltage transformer (not shown) that applies a high voltage to the magnetron (not shown) and radiates the radio frequency into the cooking compartment 411.

The grilling unit 419b includes a grilling heater (not shown) that radiates a radiant heat and radiates the radiant heat into the object to be cooked provided in the cooking compartment 411.

The convection unit 419c includes a convection heater (not shown) that heats air and a circulation fan (not shown) that supplies air heated by the convection heater (not shown) to the cooking compartment 411 and supplies hot wind to the cooking compartment 411.

The controller 450 controls the operation of the cooking apparatus 400. In detail, a cooking time or the weight of the object to be cooked is input to the controller 450 through the manipulation unit 420, the controller 450 controls the driving unit 417 to activate the radio-frequency unit 419a, the grilling unit 419b, and the convection unit 419c. That is, the controller 450 heats the object to be cooked accommodated in the cooking compartment 411 based on the cooking time or the weight of the object to be cooked input through the manipulation unit 420.

Also, if an operating sound output condition is satisfied, the controller 450 controls the sound output unit 440 to output an operating sound corresponding to the operating sound output condition. For example, if cooking of the cooking apparatus 400 starts, the controller 450 controls the sound output unit 440 to output an operating sound corresponding to starting cooking, and if cooking of the cooking apparatus 400 is completed, the controller 450 controls the sound output unit 440 to output an operating sound corresponding to completing cooking.

The user may input sounds and may select one from among the input sounds, thereby setting the operating sound of the cooking apparatus 400. In detail, the user may input a musical scale and a beat of the sound through the manipulation unit 420, may download sound data through the communication unit 470, may directly input a sound through the sound input unit 480, or may allow a part from among the input sounds to be mapped to the operating sound list, thereby setting the selected sound to the operating sound of the cooking apparatus 400.

According to the spirit of the present disclosure, a user directly inputs sounds to a home appliance and selects an operating sound from among the sounds so that the home appliance capable of providing various operating sounds according to a user's taste can be provided.

Figure 14:
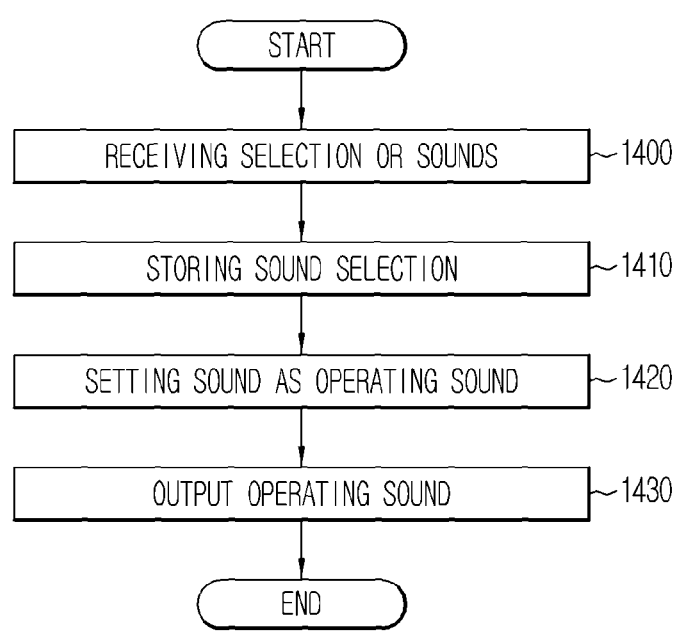
FIG. 14 illustrates a method of controlling a home appliance that outputs an operating sound according to example embodiments.

FIG. 14 illustrates a method of controlling a home appliance that outputs an operating sound according to example embodiments.

In operation 1400 a selection of one or more sounds may be obtained from a user. For example, the one or more sounds may be input by the user by way of the sound input unit 80. The input sounds may include a user's voice, sounds of nature, and a crying sound of an animal, for example. Alternatively, the one or more sounds selected by the user may be obtained by the communication unit 70 and may include sound effects, music in compressed audio format, ring tones, song snippets, or any other type of audio data stored by a user or obtainable from the Internet. As another alternative, the one or more sounds may be input by the user using the manipulation unit 20.

In operation 1410, the user-selected sounds may be stored. The user-selected sounds may be stored for example in the appliance such as in storage unit 60 of the appliance.

In operation 1420, the user may set a selected sound as an operating sound by selecting one from among the various stored sounds to correspond to a particular operating sound output condition. For example, the user may select one from among various sounds displayed in the sound display region 121b of FIG. 7, and may allow the selected sound to be mapped to the operating sound list displayed in the operating sound list display region 121a, thereby setting the operating sound.

In operation 1430, the operating sound may be output when the operating sound output condition has been satisfied. For example, the controller 50 may control the sound output unit 40 to output the operating sound when the operating sound output condition has been satisfied.

The methods according to the above-described example embodiments may be recorded in non-transitory computer-readable media including program instructions to implement various operations embodied by a processor. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. The media may also include, alone or in combination with the program instructions, data files, data structures, and the like. Examples of non-transitory processor-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the described methods may be executed on a general purpose processor or processor or may be executed on a particular machine such as the home appliance apparatus described herein.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A home appliance that outputs an operating sound when a predetermined event occurs, the home appliance comprising:
    a display unit to display at least one candidate sound;
    an input unit to receive a user input;
    a sound output unit to output the operating sound; and
    a controller to set a sound of the at least one candidate sound as the operating sound according to the user input, and to control the sound output unit to output the set sound when the predetermined event occurs.

2. The home appliance according to claim 1, wherein the display unit displays an event list corresponding to the predetermined event and a sound list corresponding to the at least one candidate sound.

3. The home appliance according to claim 2, wherein the input unit allows the sound list and the event list to be mapped to each other so that a sound to be set as the operating sound is able to be selected.

4. The home appliance according to claim 3, further comprising a sound input unit through which the at least one candidate sounds are input by the user.

5. The home appliance according to claim 4, wherein the controller converts the at least one candidate sound input from the sound input unit into sound data and stores the converted sound data in a storage unit of the home appliance.

6. The home appliance according to claim 3, further comprising a communication unit that receives sound data from an external device, the sound data including the at least one candidate sound.

7. The home appliance according to claim 6, wherein the controller stores the received sound data in a storage unit of the home appliance.

8. The home appliance according to claim 3, wherein the predetermined event comprises at least one of: turning on the home appliance, turning off the home appliance, starting an operation of the home appliance, completing the operation of the home appliance, changing an operating mode of the home appliance, and changing settings of the home appliance.

9. A method of controlling a home appliance that outputs an operating sound when a predetermined event occurs, the method comprising:
    displaying at least one candidate sound;
    receiving a user input;
    setting a sound of the at least one candidate sound as an operating sound according to the user input, the operating sound corresponding to the predetermined even; and
    outputting the at least one sound when the predetermined event occurs.

10. The method according to claim 9, wherein the setting of the sound of the at least one candidate sound as the operating sound comprises displaying an event list corresponding to the predetermined event and a sound list corresponding to the at least one candidate sound.

11. The method according to claim 10, wherein the setting of the sound of at least one candidate sound as the operating sound comprises allowing the sound list and the event list to be mapped to each other so that a sound of the sound list can be set as the operating sound by way of the mapping.

12. The method according to claim 10, further comprising recording sound through a sound input unit.

13. The method according to claim 10, further comprising receiving sound data from an external device, the sound data including the at least one candidate sound.

14. The method according to claim 10, wherein the predetermined event comprises at least one of: turning on the home appliance, turning off the home appliance, starting an operation of the home appliance, completing the operation of the home appliance, changing an operating mode of the home appliance, and changing settings of the home appliance.

15. A graphical user interface to be displayed on a display of a home appliance that outputs an operating sound when a predetermined event occurs, the graphical user interface comprising:
    an event list display region disposed at a first side of the graphical user interface, wherein the event list display region lists a plurality of events of the home appliance in which an operating sound could be output; and
    a sound display region disposed at a second side of the graphical user interface wherein the sound display region displays a plurality of sounds stored in the home appliance.

16. The graphical user interface according to claim 15, further comprising:
    a selection portion of the graphical user interface to receive a selection of one sound from among the a plurality of sounds displayed in the sound display region and to allow the selected sound to be mapped to the event list displayed in the event list display region, thereby allowing setting of an operating sound.

* * * * *